Feb. 13, 1934.　　　　S. J. ZAND　　　　1,946,657
GYROSCOPIC INSTRUMENT FOR AIRCRAFT
Filed March 15, 1933
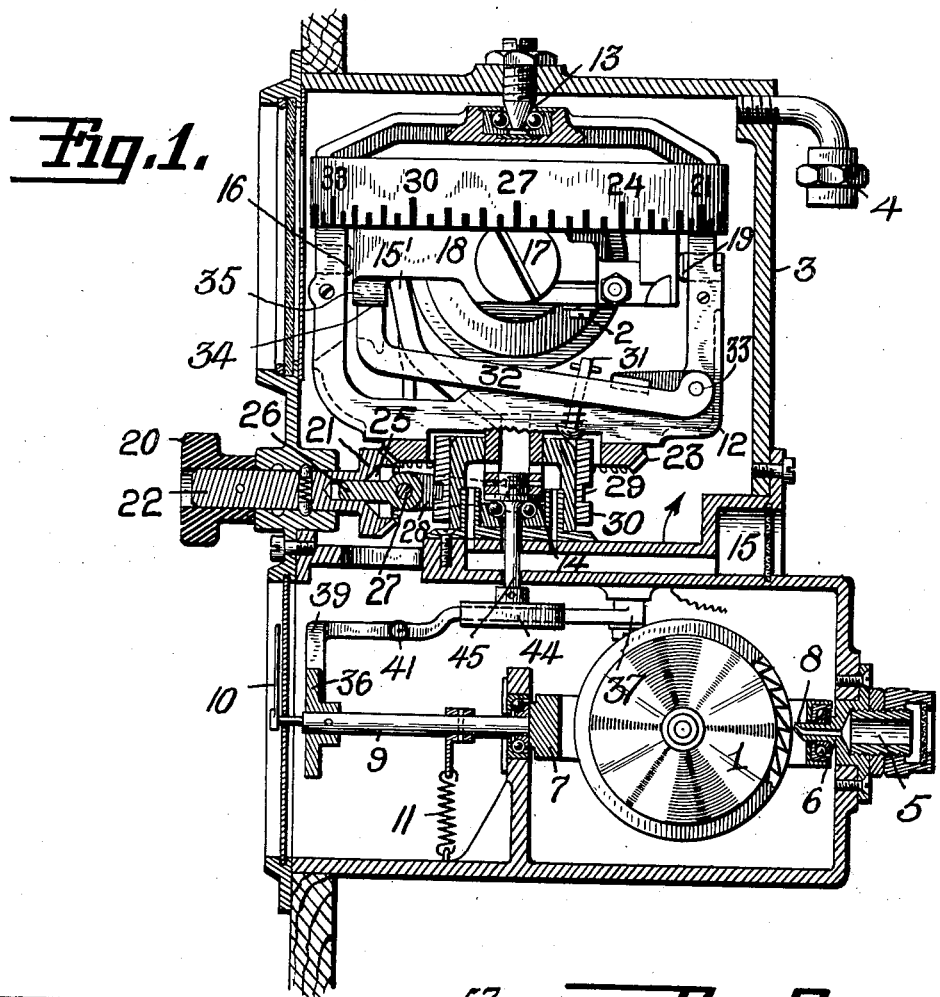
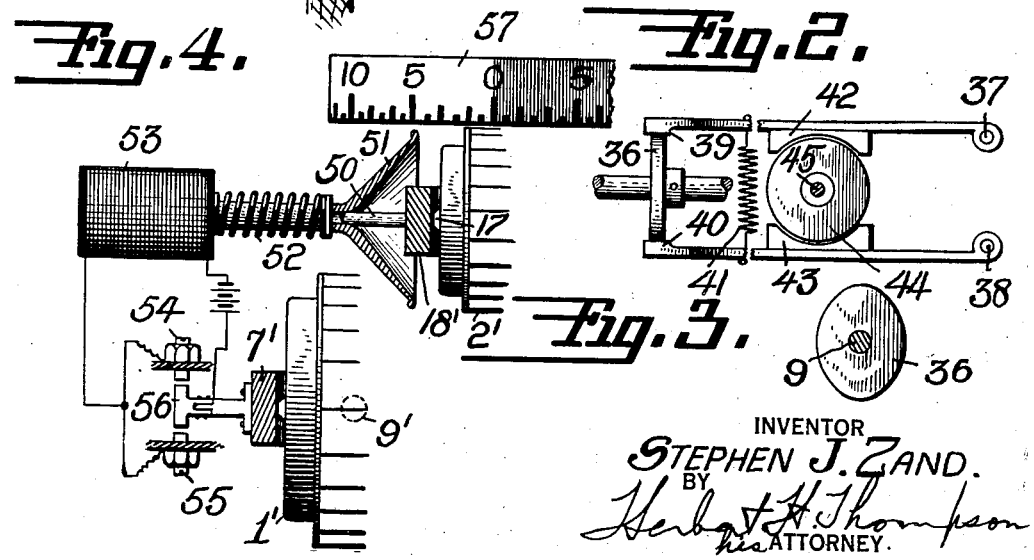
INVENTOR
STEPHEN J. ZAND.
BY
Herbert H. Thompson
his ATTORNEY.

Patented Feb. 13, 1934

1,946,657

UNITED STATES PATENT OFFICE 1,946,657

GYROSCOPIC INSTRUMENT FOR AIRCRAFT

Stephen J. Zand, Forest Hills, N. Y., assignor to Sperry Gyroscope Company, Inc., Brooklyn, N. Y., a corporation of New York Application March 15, 1933. Serial No. 660,801

4 Claims. (Cl. 33—204)

This invention relates to gyroscopic directional instruments for aircraft. At present there are two principal types of such instruments on the market known respectively as the turn indicator and the directional gyro. The former is a gyroscope mounted with only two degrees of freedom on the craft so that when the craft turns, the gyro precesses about an axis at an angle to the axis of turn. While such an instrument readily shows when the aircraft is turning, it does not show the amount of turn quantitatively. The directional gyroscope is a free or three degrees of freedom gyroscope mounted so as to maintain its position on the aircraft and, therefore, to act as a compass. Such gyroscopes, however, are subject to wandering so that after operating for 15 minutes or more, they may indicate a turn when in fact no turn has taken place. Both instruments are, therefore, subject to defects and it is proposed by my invention to overcome the defects of both by a novel combination between the two. To this end I maintain the directional gyroscope normally locked on the plane and only release it at the time the aircraft is turning to show the amount of turn. I then employ the turn indicator, not only to indicate the turn but to release the directional gyroscope when the aircraft turns to show the amount of turn.

Referring to the drawing showing several forms my invention may assume,

Fig. 1 is a vertical section through my combined gyroscopic indicator, parts being in elevation.

Fig. 2 is a detailed view in plan of the brake or lock means operated by the turn indicator gyro and operating on the directional gyro.

Fig. 3 is a detail of the cam used to operate the same.

Fig. 4 is a diagrammatic view of a modified form of the invention in which the directional gyroscope is caged in a predetermined position on the craft.

A conventional form of both types of gyroscope is shown in the drawing the turn indicator gyroscope being shown at 1 and the directional gyroscope at 2. Both gyroscopes are preferably air driven for which purpose they may be enclosed in a casing 3 from which air is exhausted through pipe 4. Air for spinning the turn indicator gyro enters through the passage 5 and hollow trunnion 6 of the rotor bearing ring 7 from whence it emerges through nozzle 8 to engage buckets on the gyro wheel. At its opposite side ring 7 is provided with a trunnion or a shaft 9 which carries at its outer end a turn indicating index 10. Centralizing spring 11 may also be secured to said shaft.

The directional gyroscope is shown as mounted above the turn indicator gyroscope in a vertical ring 12 journaled for rotation about the vertical axis in upper and lower bearings 13 and 14. One of said bearings may be made hollow to admit atmospheric air through passage 15 for driving the rotor, said air passing up through a pipe 15' to the nozzles which preferably act both to spin the rotor and centralize the same about axis 16—19 (see the copending application of Bert G. Carlson, Serial No. 533,648 filed April 29, 1931 for Directional gyroscopes). Said rotor is journaled on a normally horizontal spinning axis 17 in rotor bearing frame 18 which is journaled on trunnions 16 and 19 in the vertical ring. A manual caging and locking means is shown for the gyroscope for setting the same in any desired position. Said means comprises a thumb piece 20 which, when pushed in, causes the gear 21 on the inner end of the shaft 22 thereof to engage a complementary gear 23 on the base of the vertical ring. Rotation of the thumb piece at this time, therefore, turns the vertical ring and gyroscope in azimuth. When the thumb piece is pushed in, a conical-shaped aperture therein 25 also engages and centralizes a pin 26 pivoted at 27 and secured to a fork 28. Said fork engages at its outer end a groove 29 in a sliding collar 30 to raise the same, thus lifting a pin 31 extending downwardly from locking arm 32 pivoted on the vertical ring at 33. When the collar is pushed upwardly, therefore, the locking arm is raised to bring the outer flattened end 34 thereof into engagement with flattened portion 35 on the rotor bearing ring 18 so that the gyroscope is locked simultaneously about both axes. After the gyroscope is set in the desired position, the button 20 is pulled outwardly to release the same.

Preferably, however, I provide a means for maintaining the gyroscope locked until the aircraft turns. For this purpose I have shown on the trunnion 9 of the turn indicator gyroscope a cam 36. On the sides of said cam are pivoted at 37—38 arms 39 and 40 which are normally held against the cam by spring 41. Said arms are provided with brake shoes 42 and 43 and normally engage a brake drum 44 on the shaft 45 secured to the vertical ring 12 of the gyroscope 2. When the turn indicator gyroscope is centralized and the cam 36 positioned as shown in Fig. 3, the brake drum 44 is firmly gripped by the brake shoes so that the gyroscope is locked about its vertical axis. As soon as turning takes place, however, gyroscope 1 precesses, rotating cam 36 to release the brake shoes thereby freeing the directional gyroscope to measure the amount of turn. Upon completion of the turn, the turn indicator gyroscope again returns to its upright position, relocking the directional gyroscope.

In Fig. 4 is illustrated a modified form of the invention in which an automatically operated conical cage is provided which locks the gyroscope about both axes and which also locks the same in the same position on the craft. The gyroscope, therefore, becomes a "deviometer" showing merely the amount of deviation from a course. To this end I have shown a pin 50 extending laterally from the rotor bearing ring 18' of the directional gyroscope and preferably in line with the spinning axis of the rotor 2'. Said pin is adapted to be engaged by conical cage 51 normally pressed into engagement with said pin by compression spring 52 but withdrawn by the solenoid 53 when either of contacts 54 or 55 are made with a common contact 56 on the bearing ring 7' of the turn indicator gyro 1'. In this case the indicator card 57 on the gyroscope may be provided with arbitrary graduations on each side of zero, the card in one direction being white, for instance, and in the other direction, red.

My invention offers a further advantage, that the directional gyroscope as now built is very expensive owing to the accuracy with which all parts must be made to reduce wandering to a minimum over a long period. With my gyroscopic combination, on the other hand, the time in which the directional gyroscope is released may be small, on the order of a minute or two so that the directional gyroscope would not have to be made with nearly so great accuracy as the present type of directional gyroscope. Therefore, my combination instrument may be made at a less cost than a single directional gyroscope and at the same time give as good results as separate turn indicator and directional gyroscopes.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a gyroscopic indicator for aircraft, a turn indicator gyroscope, a free directional gyroscope, means for maintaining the latter normally locked, and means operated by precession of said turn gyroscope for releasing said directional gyroscope during a turn.

2. In a gyroscopic indicator for aircraft, a turn indicator gyroscope, a free directional gyroscope, means for caging the latter in a predetermined position on the craft, and means operated by precession of said turn gyroscope for releasing said directional gyroscope during a turn.

3. In a gyroscopic indicator for aircraft, a turn indicator gyroscope, a free directional gyroscope, means for maintaining the latter normally locked about both axes, and means operated by precession of said turn gyroscope for releasing said directional gyroscope about both axes during a turn.

4. In a gyroscopic indicator for aircraft, a turn indicator gyroscope mounted for precession about a horizontal axis, a directional gyroscope mounted with freedom about horizontal and vertical axes, centralizing means for preventing large tilts about said horizontal axis, a brake for locking the same about its vertical axis, and means brought into action by precession of said first named gyroscope for temporarily releasing said brake.

STEPHEN J. ZAND.